July 5, 1938.　　　J. J. DONOVAN　　　2,123,136
BLANK MEASURING AND DISTRIBUTING MACHINE
Filed Feb. 5, 1936　　　8 Sheets-Sheet 1

Inventor=
James J. Donovan,
by Roberts, Cushman & Woodberry
Att'ys.

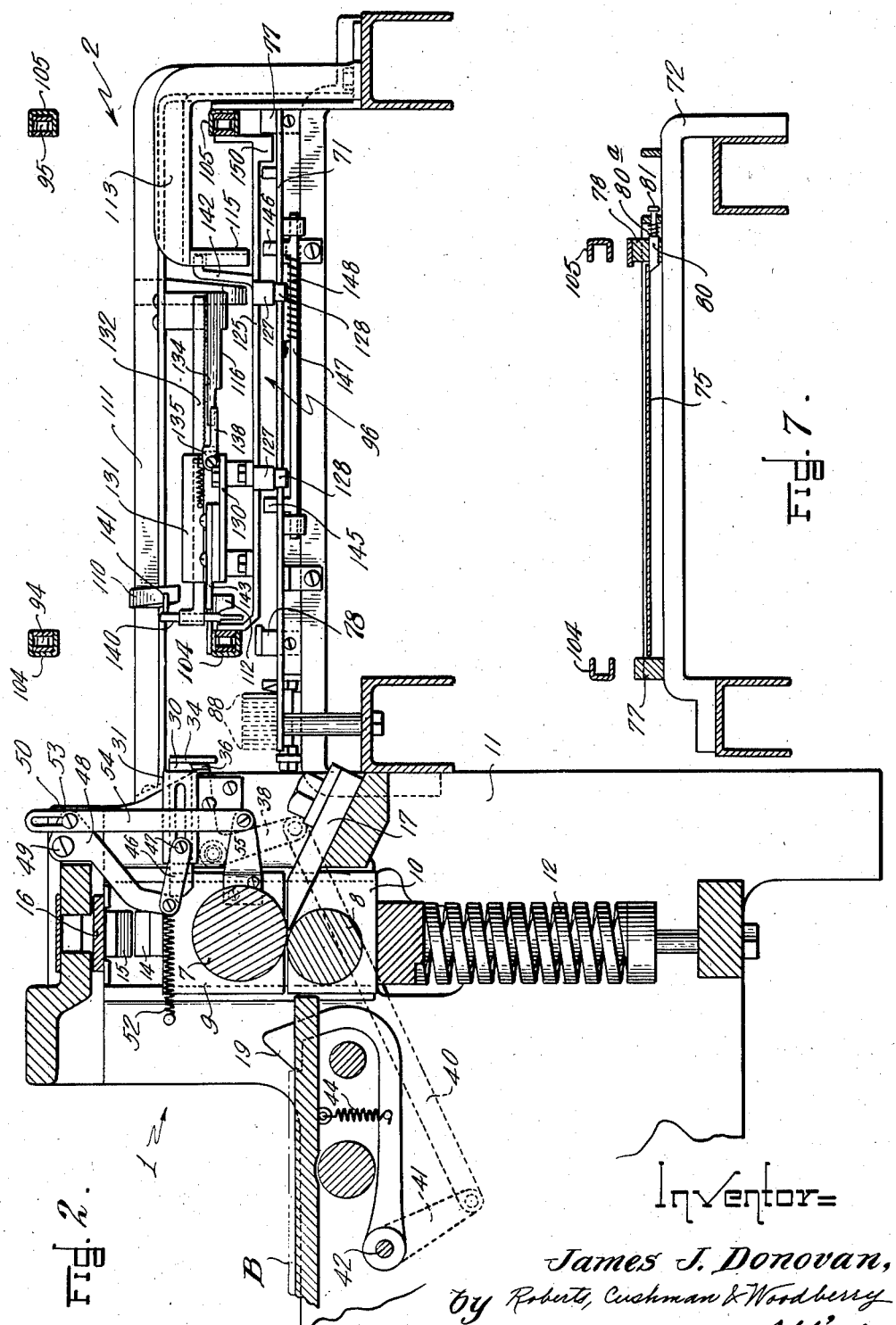

July 5, 1938.   J. J. DONOVAN   2,123,136
BLANK MEASURING AND DISTRIBUTING MACHINE
Filed Feb. 5, 1936   8 Sheets-Sheet 3
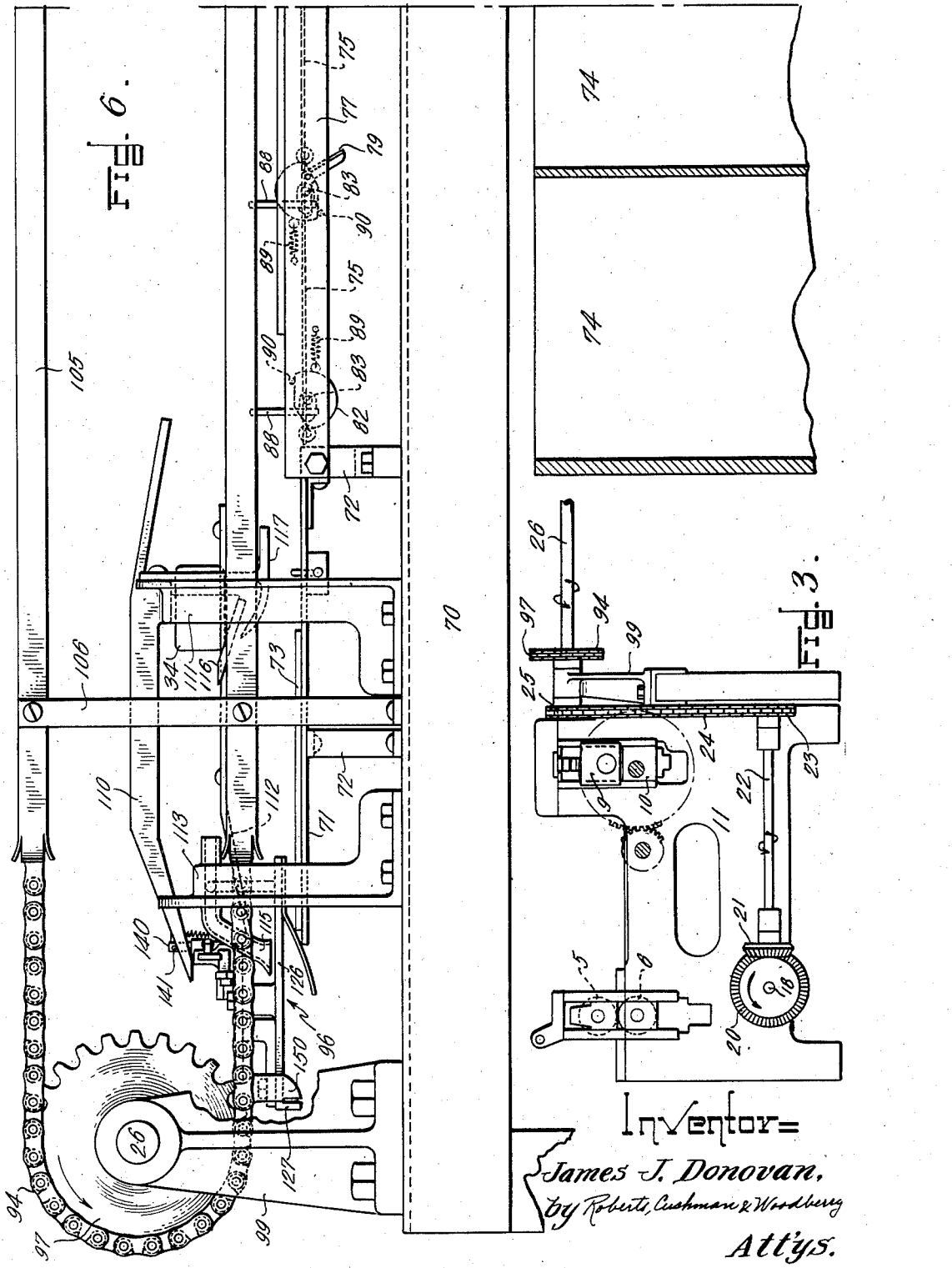
Inventor=
James J. Donovan,
by Roberts, Cushman & Woodberg
Attys.

July 5, 1938.   J. J. DONOVAN   2,123,136
BLANK MEASURING AND DISTRIBUTING MACHINE
Filed Feb. 5, 1936   8 Sheets-Sheet 4
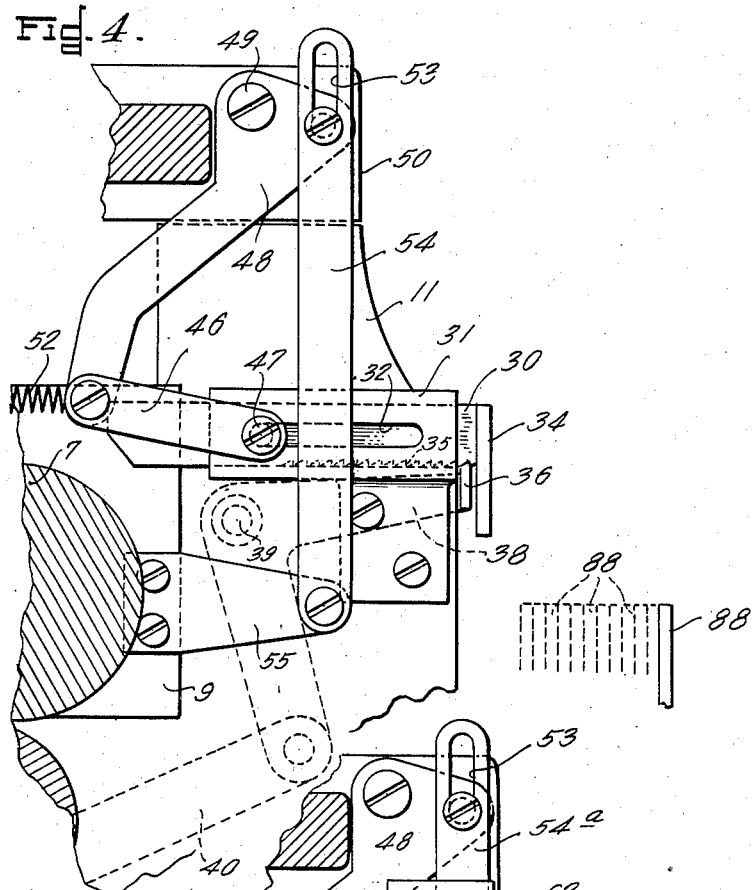
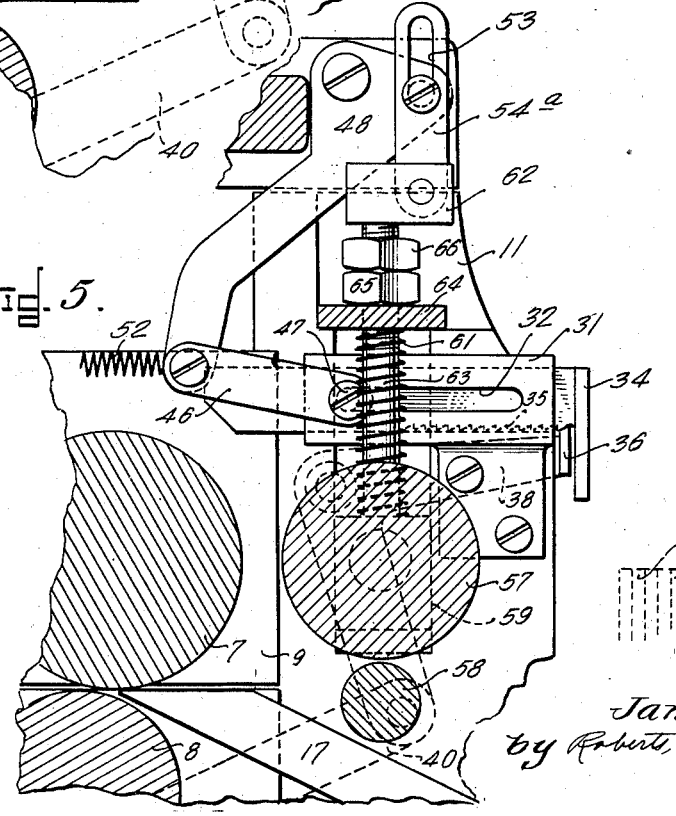
Inventor=
James J. Donovan,
by Roberts, Cushman & Woodberry
Attys.

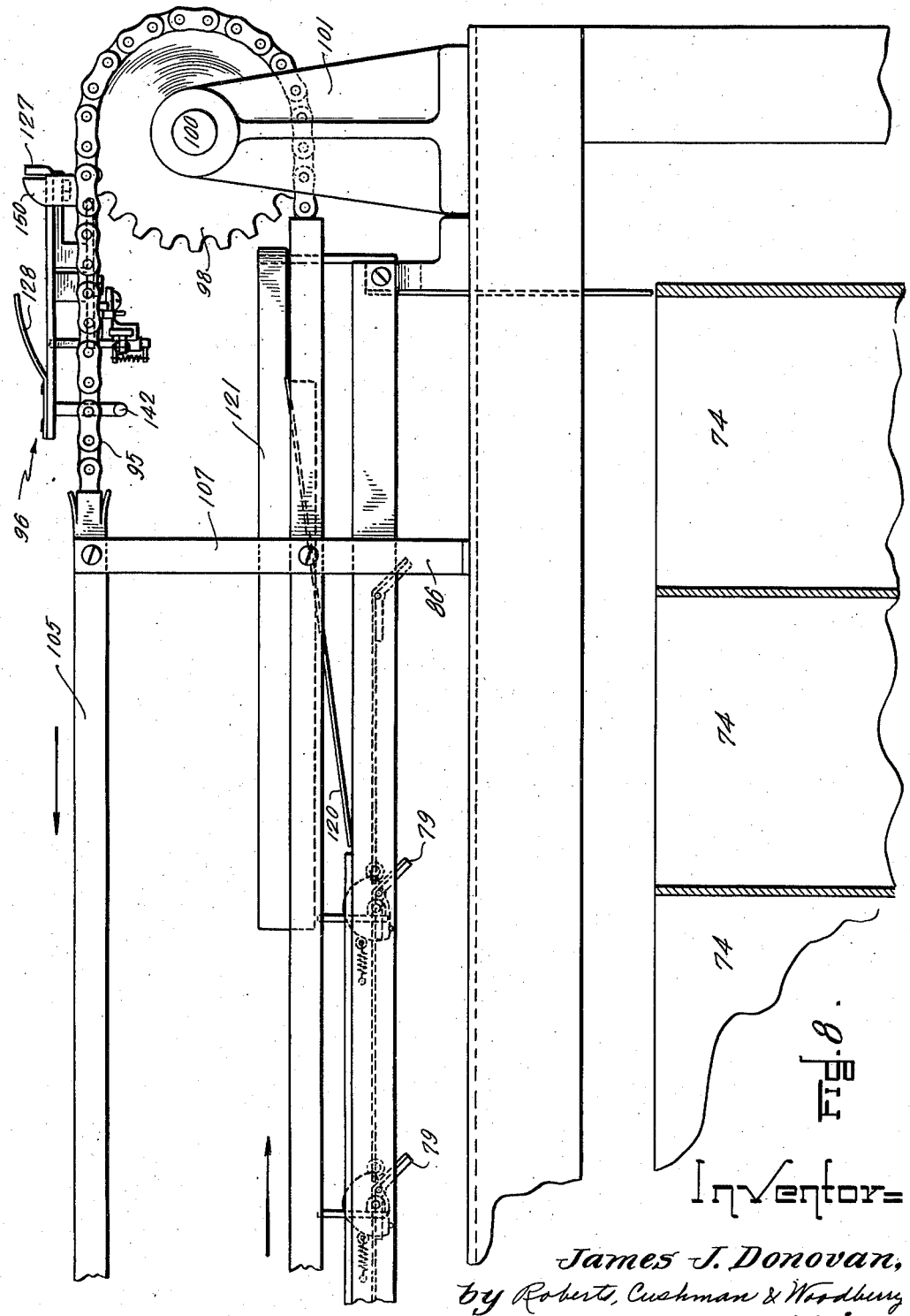

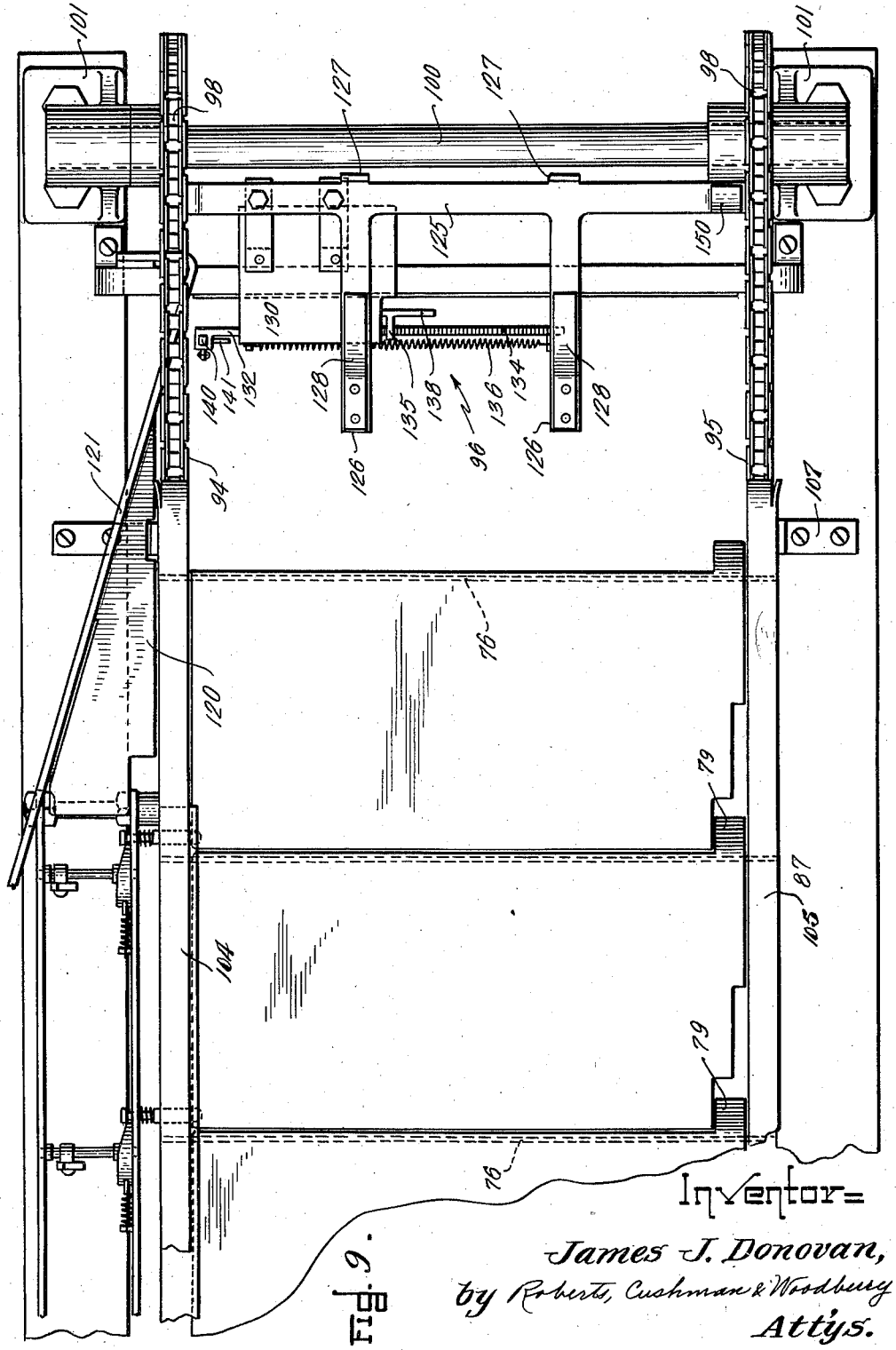

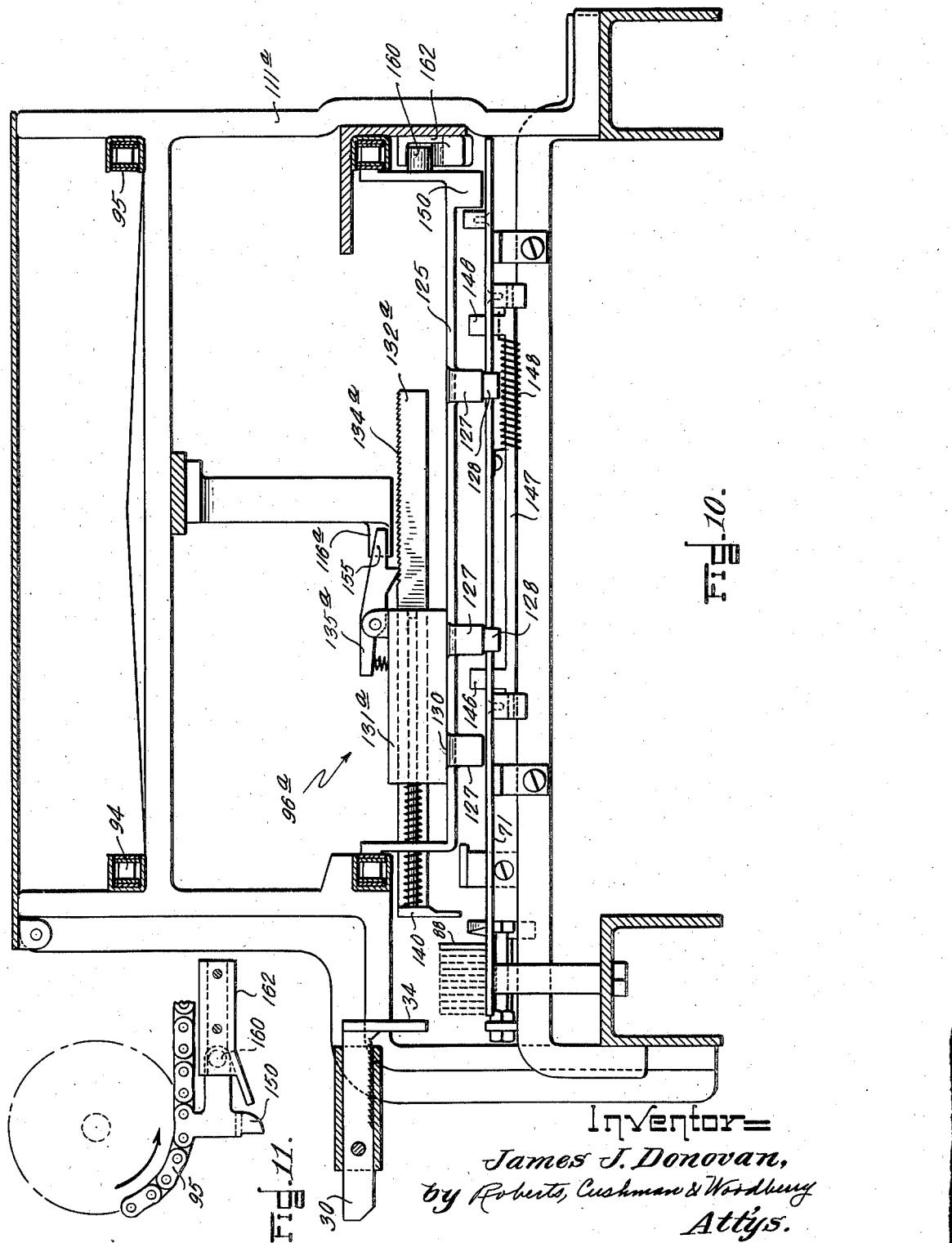

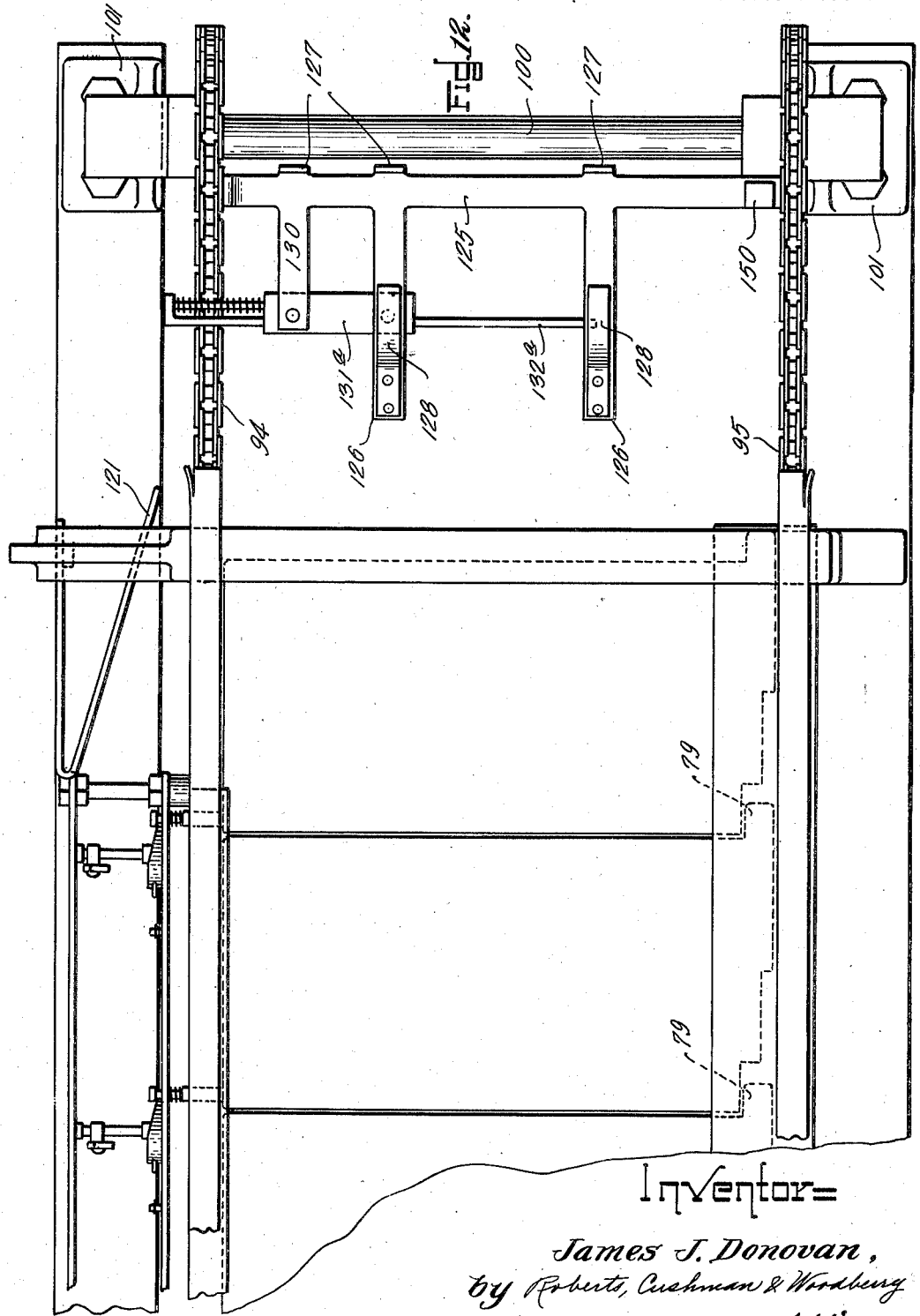

Patented July 5, 1938

2,123,136

UNITED STATES PATENT OFFICE 2,123,136

BLANK MEASURING AND DISTRIBUTING MACHINE

James J. Donovan, Arlington, Mass., assignor to North American Holding Corporation, Syracuse, N. Y., a corporation of New York Application February 5, 1936, Serial No. 62,478

10 Claims. (Cl. 209—88)

This invention relates to a machine for measuring, distributing and sorting soles, heel lifts, taps and other blanks of the types used in shoe making.

The principal object of the invention is to provide a machine which is of relatively simple construction, accurate and reliable in operation and which is more efficient than those heretofore proposed.

Further objects will be apparent from a consideration of the following description and the accompanying drawings, wherein—

Fig. 2 is a section on the line 2—2 of Fig. 1;

Fig. 3 is a side elevation, on a reduced scale, of a part of the evening machine;

Fig. 4 is a fragmentary elevation, partly in section, showing the trip setting mechanism associated with the measuring and evening rolls;

Fig. 5 is a view similar to Fig. 3, but showing a modified type of trip setting mechanism;

Fig. 6 is a side elevation of the distributing mechanism shown in Fig. 1;

Fig. 7 is a section, with parts removed, taken on the line 7—7 of Fig. 1;

Fig. 8 is an enlarged fragmentary elevation showing the rear of the distributing mechanism;

Fig. 9 is an enlarged top plan view of the rear of the distributing mechanism;

Fig. 10 is an end elevation, partly in section, showing a modified construction;

Fig. 11 is a detail view showing the connection between the carriage and conveyor chain; and Fig. 12 is a top plan view of the rear of the distributing mechanism shown in Fig. 10.

Figure 1:
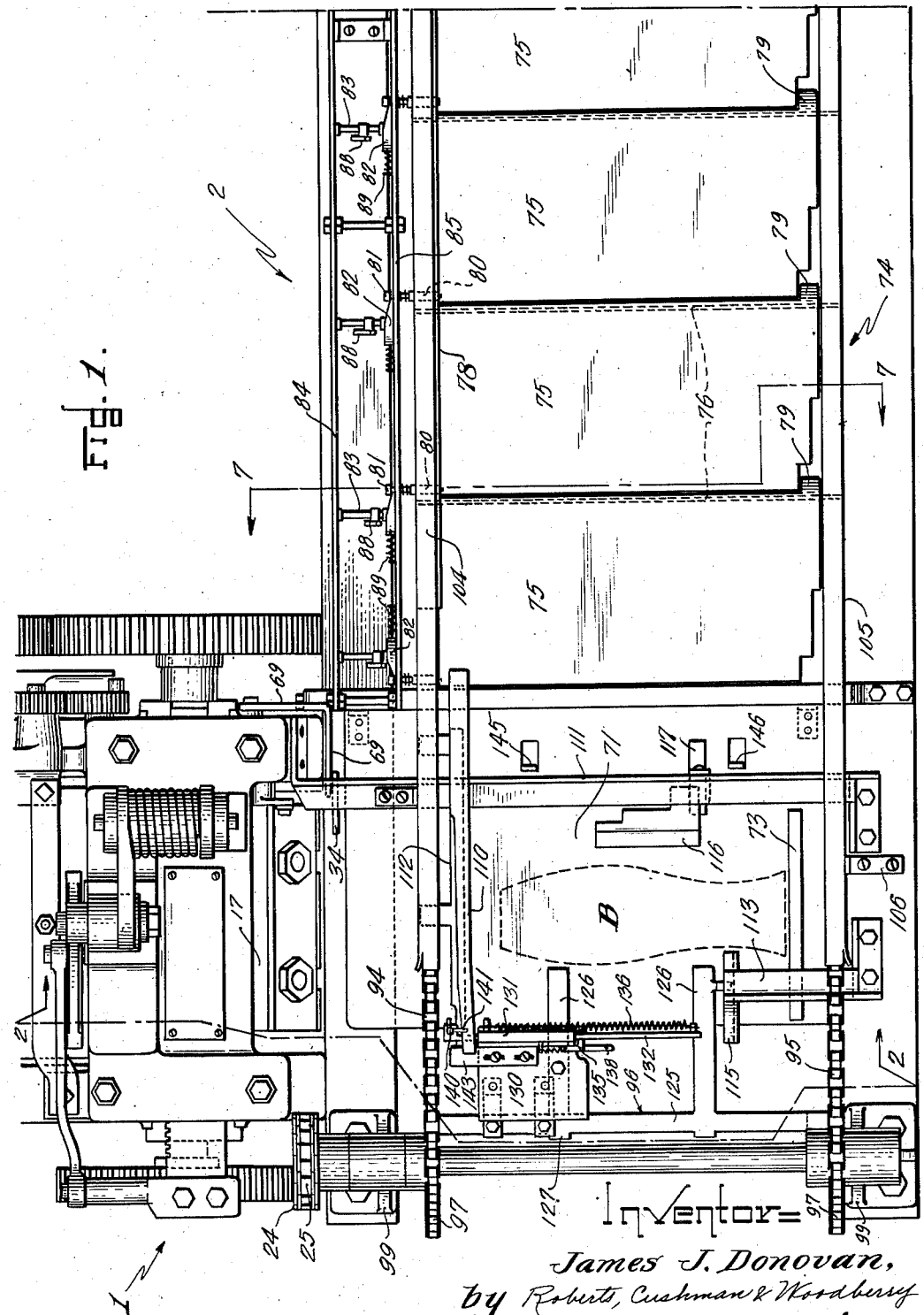
Fig. 1 is a top plan view of a machine constructed in accordance with the present invention.

The embodiment shown in Figs. 1 to 9 comprises an evening and a calipering mechanism, designated generally by the numeral 1 (Figs. 1 and 2), which is constructed and arranged to discharge successive blanks on to the distributing mechanism designated generally by the numeral 2. As the evening and calipering mechanism, hereinafter referred to as the grader, is of the type shown in the United States patent to Nichols No. 1,057,358 and the United States patent to Cogswell No. 1,820,010, to which reference may be had for a complete description, the present description will be limited to those parts of the mechanism which are directly associated with the distributing mechanism 2.

Referring to Figs. 1 to 3, the grader comprises the usual calipering rolls 5 and 6 (Fig. 3) through which the blanks pass on their way to the evening and feeding rolls 7 and 8 (Fig. 2). The rolls 7 and 8 are journaled in bearings 9 and 10 which are slidably mounted in vertical guides carried by the frame 11, the lower bearings 10 being supported by heavy compression springs 12. The lower wedges 14 are carried by the bearings 9 and cooperate with the upper wedges 15 mounted on the under side of the slide 16 which may be connected with the calipering rolls 5 and 6, as shown in the above-mentioned patents to Nichols and Cogswell. The skiving knife 17 is mounted in the usual manner to cooperate with the rolls 7 and 8 so as to remove a skiving from the bottom or flesh side of a blank, depending upon the setting of the wedges 15, which is governed by the calipering rolls acting through the slide 16.

The calipering rolls 5 and 6 and the skiving rolls 7 and 8 are continuously rotated by the usual driving connections and the feed shaft 18, normally at rest, is connected with an actuating mechanism (not shown) controlled by the pivoted trip 19 which, when depressed, is not only operative to effect the operation of the marking mechanism, but also to effect the operation of the actuating mechanism so as to cause the feed shaft 18 to turn one revolution. The feed shaft 18 is connected by gears 20 and 21 to a shaft 22 which carries a sprocket wheel 23 connected by a chain 24 to a sprocket wheel 25 secured to a shaft 26 journaled in a bearing fixed to the frame 11. The shaft 26 extends rearwardly, as shown in Fig. 3, and provides the drive for the distributing mechanism 2.

Referring to Figs. 2 and 4, a slidebar 30 is mounted in a sleeve 31 having a longitudinally extending slot 32, the sleeve 31 being rigidly secured to the frame 11. Secured to the outer end of the slidebar 30 is an enlarged flat plate providing a stop 34 which constitutes a controller member for positioning a trip 140, and the lower edge of the slidebar is provided with a row of ratchet teeth 35. A latch or pawl 36, secured to one end of a bell crank lever 38 pivoted at 39 to the frame 11, cooperates with the ratchet teeth 35 to hold the slidebar 30 and stop 34 against retraction or inward movement. The opposite end of the bell crank 38 is pivotally connected to one end of a link 40 and the opposite end of the link is pivotally connected to the free end of an arm 41 secured to a rock shaft 42 which supports the trip 19. A spring 44 normally holds the trip 19 and aforementioned elements associated therewith in the position shown in Figs. 2 and 4. It is apparent that when a blank passes from the calipering rolls 5 and 6 to the skiving and feeding rolls 7 and 8 (Fig. 2) it strikes the cam-like nose of the trip 19, thereby depressing the trip and causing the rock shaft 42 to rotate in a clockwise direction and thus retract the pawl or latch 36.

The slidebar 30 is pivotally connected to one end of a link 46 by a pin 47 which passes through the slot 32 in the sleeve 31, and the opposite end of the link 46 is pivotally connected to one arm of a bell crank 48 pivoted at 49 to a block 50 rigidly secured to the frame 11. A spring 52 yieldingly urges the slidebar 30 inwardly and upon the release of the latch 36 draws the slidebar and stop to retracted position, as shown in Figs. 2, 4 and 5. The other arm of the bell crank 48 carries a pin which rides in a slot 53 in a link 54 which is connected by an arm 55 with one of the journal boxes or bearings 9, the parts being so designed that when the upper roll 7 is at its lowermost position, the pin abuts the lower end of the slot 53, thereby permitting the slidebar 30 to be retracted to its full extent.

When a blank passes between the rolls 7 and 8, the upper roll 7 is lifted a distance governed by the relative position of the wedges 14 and 15, and this upward displacement of the roll 7, acting through the arm 55, link 54, bell crank 48, and link 46, causes the stop 34 to move outwardly against the action of the spring 52 to a position corresponding to the thickness to which the blank is evened or skived by the knife 17. As the latch 36 normally engages the ratchet teeth 35, it holds the stop 34 in "set position" until the succeeding blank discharged from the calipering rolls 5 and 6 engages the trip 19 and effects the release of the slidebar and stop.

In the modification shown in Fig. 5 a pair of continuously driven feeding and calipering rolls 57 and 58 are positioned to receive the blanks discharged from the skiving rolls 7 and 8, the upper roll 57 being journaled in bearings or journal blocks 59 which slide in vertical guides rigidly secured to the frame 11, and a compression spring 61 is provided yieldingly to urge the upper roll 57 toward the lower roll 58. In this construction the link 54ª, which is relatively shorter than the corresponding link 54 of the embodiment shown in Fig. 4, is connected to a block 62 rigidly secured to the upper end of one of a pair of spindles 63 which extend downwardly through openings in brackets 64. The lower ends of the spindle 63 are secured to the bearings or journal boxes 59 and their upper ends are threaded to receive a stop nut 65 and a lock nut 66, by means of which the extent of the downward movement of the roll 57 may be varied and secured in adjusted position. The compression springs 61 are circumposed about the spindles 63 so as to act against the journal boxes 59 and the under side of the brackets 64. The operation of this type of construction is substantially the same as that shown in Figs. 2 and 4, except that the setting of the stop 34 is governed by the upward displacement of the roll 57.

Referring to Figs. 1, 2, 6, and 7, the distributing mechanism 2 comprises a frame 70 which is supported at one side by suitable uprights and at its opposite side by brackets secured to the frame 11 of the grader. A receiving platform or bed plate 71 is supported upon the frame 70 by brackets 72 and is disposed in alignment with and at substantially the same horizontal level as the feeding and skiving rolls 7 and 8 (Fig. 2), so that blanks B are discharged from the grader directly onto the bed plate in position against a stop 73, as shown by the dotted lines in Fig. 1.

A series of unloading stations, bins or receptacles 74 is disposed beneath the frame 70 and rearwardly of the bed plate 71 (Fig. 6) and with the exception of the rear receptacle each is provided with a trapdoor or tilting gate 75. The upper faces of the trapdoors are in the same horizontal plane and collectively define a slideway at substantially the same horizontal level as the bed plate 71, as shown in Figs. 1 and 6. Each of the trapdoors is pivotally supported along one edge by a pintle 76 (Figs. 1 and 9) whose opposite ends are journaled in upstanding bars 77 and 78 carried by the frame 70 (Figs. 1 and 7). The rear edge of each trapdoor 75 is formed with a downwardly extending arm or tail 79 (Figs. 1, 6, 8 and 9) which projects upwardly beyond the slideway when the trapdoor is in open position. Each door is normally held in closed position by a latch 80 (Fig. 7) slidably mounted in a transversely extending opening in the bar 78 and a spring 80ª carried by each latch normally holds it in locking position. The outer end of each latch is formed with a head 81 which is cooperatively associated with a cam 82 carried by a rock shaft 83 journaled in bearings in spaced upright frame members 84 and 85 (Figs. 1 and 6) supported on the frame 70 by brackets 72 and 86 (Figs. 6 and 8). Each rock shaft 83 carries an upstanding latch releasing member or abutment arm 88 and these abutment arms are transversely offset, relative to the center of the slideway, distances corresponding to the difference in thickness between the different sizes of blanks, for example, a difference of ½ or 1 iron. Each cam is normally held disengaged from its latch head 81 by a spring 89 which yieldingly holds the cam against a stop pin 90. When one of the abutment arms 88 is swung rearwardly its associated cam 82 is rotated clockwise (Fig. 6) so as to engage the associated latch head and push the latch connected thereto outwardly, thereby permitting the trapdoor to drop downwardly by gravity.

The conveyor mechanism comprises a pair of spaced endless chains 94 and 95 which extend above the platform 71 and slideway and which support one or more carriers, designated generally by the numeral 96. In the embodiment herein shown four carriers are used and the mechanism is so designed that when the feed shaft 26 makes one revolution, as above described, it causes each carrier 96 to move one quarter of its total travel. A greater or lesser number of carriers may be used in which case the driving mechanism should be modified so as to cause the carriers to move a greater or lesser distance for each revolution of the driving shaft 26.

The chains 94 and 95 are carried by two pairs of sprocket wheels 97 and 98, the sprocket wheels 97 being secured to the driving shaft 26 which is journaled in stanchions 99 rigidly secured to the front end of the frame 70, and the sprocket wheels 98 being mounted on a shaft 100 journaled in stanchions 101 rigidly secured to the rear of the frame 70 (Figs. 8 and 9). The upper and lower run of each chain snugly fits within and is guided by horizontally extending channels 104 and 105 disposed above the slideway and rigidly supported by brackets 106 and 107 which are secured to the frame 70.

A guide cam 110 is rigidly supported above the platform 71 by a frame member 111 (Figs. 1, 2 and 6) and another guide cam 112 is similarly supported by the lower channel 104, these cams being positioned adjacent to the front of the platform 71 and between the chains 94 and 95, as shown in Fig. 2. A guide sleeve 115 (Figs. 2 and 6) is secured to the frame member 113 adjacent to the outer edge of the platform 71 and a tripping cam 116 and associated guide member 117 are secured to the frame member 111 at a point approximately opposite the stop 34, as shown in Figs. 1 and 6.

Referring to Figs. 8 and 9, an upwardly inclined cam 120 and an inwardly extending cam 121 are supported adjacent to one of the rear sprocket wheels 98, the upper end of the cam 120 terminating above the level of the top of the lower guide channel 105 through which the lower stretch of said chain extends and the inner end of the cam 121 terminating inwardly of said sprocket wheel 98 and chain. These cams 120 and 121 constitute a repositioning means for the automatic trip which is associated with the carrier 96 and are therefore located at a point rearwardly of the latch releasing abutment for the last gate or trapdoor 75.

Each carrier 96 (Figs. 1, 2, 6 and 9) comprises a cross bar 125 whose ends are welded or otherwise secured to aligned links of the chains 94 and 95. This cross bar is provided with a pair of forwardly extending arms 126 and at its rear edge with a pair of downwardly extending fingers 127, each arm having a leaf spring presser finger 128. The fingers 127 are arranged to engage the edge of a blank B and the spring fingers 128 are disposed yieldingly to engage the upper face of the blank as the carrier travels across the platform 71.

A plate 130 (Figs. 1 and 2) having a transversely disposed sleeve 131 is rigidly secured to the crossbar 125 and a bar 132 is mounted in the sleeve 131 so as to slide transversely of the path of travel of the carrier. The parts are so constructed and arranged that when the carrier is moving across the platform 71, the slidebar 132 is at the same horizontal level as the stop 34. The lower edge of the slidebar is formed with ratchet teeth 134 which cooperate with a spring-pressed latch or locking pawl 135 pivotally connected to the plate 130, the latch 135 being normally operative to hold the slidebar 132 against outward movement, but permitting the slidebar to be pushed inwardly against the action of a tension spring 136 which is secured at one end to the slidebar and at its opposite end to the plate 130. The spring 136 is normally under sufficient tension to move the bar 132 outwardly into engagement with the stop 34 but by reason of the latch 135 the slidebar is normally held in a retracted position as shown in Figs. 1, 2 and 6. The latch 135 is provided with an arm 138 (Fig. 9) arranged to engage the cam 116 as the carrier passes across the platform 171, thereby to effect the release of the slidebar and permit it to move outwardly against the stop under the action of the tension spring 136.

The outer (left-hand) end of the slidebar is formed with a vertically extending opening in which a trip rod 140 is slidably mounted and this trip rod is provided with an inwardly extending arm or pin 141 arranged to engage and ride up over the cam 116 when the slidebar is in retracted position. A small tension spring yieldingly and normally holds the trip rod in a depressed lowermost position and as the carriage moves along the slideway the arm 141 rides up the cam 116 until latch 138 is tripped by cam 116 whereupon the spring 136 throws the bar 132 endwise toward and against the stop 34 after the latter has been adjusted and positioned by either the feed rolls 7 and 8, Fig. 2, or the rolls 57 and 58, Fig. 5. At the moment of the operation of latch 138 by cam 116 the lower end of the trip rod 140 is just above the level of the lowermost channel 104 through which the lower stretch of chain 94 extends. This operation of the latch also occurs just before the trip rod reaches the crossbar 111 of the frame, and it will be clear that during this endwise movement of the bar 132 and after the trip rod 140 has passed across the top of the said channel 104 said trip rod is restored to its normal lowermost position again by its spring referred to above. It will therefore appear that the cam 110 is provided for the purpose of raising the stop rod 140 so that it will pass over the top of the channel 104 and that the cam 116 is provided to release the bar 132 at a moment when it is longitudinally aligned with the adjusted stop 34. After the bar 132 has been adjusted into position against the stop 34 and the trip rod 140 occupies its lowermost normal position again the lower end portion of the latter is then in a position wherein it engages one of the abutment members 88, depending upon the setting of the slidebar 132.

In order to steady the carrier in its movement about the sprocket wheels 97 and across the platform 71, an upwardly and outwardly extending arm 142 (Fig. 2) is provided upon the outer (right-hand) end of the carrier cross bar 125 and an arm 143 is secured to the plate 130, the end of the arm 142 being arranged to slide within the channel guide 115 as the carrier completes its swing around sprockets 97 and as it approaches the platform 71 and the arm 143 being arranged to ride along the carrier-steadying and guiding rail 112 as the carrier passes across the platform. During the passage of the carrier across the plate 71 one of the fingers 126 thereof slides beneath the cam or rail 117 whose function is to assist in holding the carrier against upward displacement while parts mounted on the carrier are being operated.

In order that the depending fingers 127 may squarely engage the edge of a blank B as the carrier travels across the platform 71, I provide a pair of upstanding fingers 145 and 146 (Figs. 1 and 2) which project through openings adjacent to the rear edge of the platform (Fig. 1), these fingers being mounted on a rock shaft 147 (Fig. 2) journaled in bearings secured to the underside of the platform. A coil spring 148, circumposed about the rock shaft 147, normally holds the fingers 145 and 146 in upright position in the path of the blank and yieldingly opposes the travel of the blank across the platform, thereby serving to position the blank squarely against the fingers 127. The blank B traveling across the platform causes the fingers 145 and 146 to swing downwardly through the openings in the platform and after the blank has passed this point the fingers are swung upwardly under the influence of the spring 148 to assume their normal positions.

At the outer (right-hand) end of the crossbar 125 is a depending cam 150 (Figs. 1 and 6) disposed in vertical alignment with the downwardly extending arms 79 on the doors 75. The cam 150 is positioned so as to engage the arms 79 when any of the doors 75 are opened and thereby close them as the carrier moves along the slideway.

The operation of the machine is as follows:

A blank B, here shown as a shoe sole but which may be a heel lift or other piece of sheet material, is fed in the usual manner to the calipering rolls 5 and 6 (Fig. 3) of the grader, the displacement of the upper roll setting the wedges 15 carried by the slide 16. The blank is delivered directly into the nip of the skiving rolls 7 and 8, but before entering depresses the trip lever 19, thereby effecting the withdrawal of the latch member 36 and consequent retraction of the stop 34. In passing through the skiving rolls the blank causes an upward displacement of the upper roll which effects the positioning of the stop 34 in accordance with the measured thickness of the blank while trip 19 is held depressed by the blank. The knife 17 removes the skiving from the blank and after being evened the blank is then discharged directly upon the platform 71 against the stop 73, as shown in Fig. 1. In the meantime one of the carriers 96 is coming into position (Figs. 1 and 6), and just after the blank is discharged upon the platform 71, the fingers 127 of the carrier engage the blank and it is slid across the platform. In moving across the platform the arm 141 rides up the cam 110 and raises the trip 140 to an elevation sufficient to clear the lower run of the chain 94 and by that time the arm 138 of latch 135 has engaged the cam 116 thus releasing slide bar 132, and permitting it to move outwardly against the positioned stop 34. The latch arm 138 then clears the cam 116 and is returned to locking position wherein it holds the slidebar 132 in "set position" corresponding to the measurement of the blank being pushed or carried along. During this time the front edge of the blank B has engaged the fingers 145 and 146 which yieldingly oppose its movement and in so doing cause the blank to become positioned squarely against the depending fingers 127.

While traveling along the slideway the trip 140 engages one of the abutments 88 and thus effects the release of the associated latch 80 and the discharge of the blank into the bin beneath the door which has been sprung or dropped open. In the event the setting of the trip 140 is such that it does not engage any of the latches, then the blank will be pushed along until it falls off the end of the slideway into the last bin or receptacle (Figs. 8 and 9).

After passing the last abutment 88, the carrier reaches the cams 120 and 121, the cam 120 being operative to raise the trip above the lower channel 104 of the adjacent chain, after which the cam 121 retracts the slidebar 132 to a position wherein the trip is disposed inwardly of the chain 94, as shown in Fig. 9 where it is caught and held by latch 138. The carrier is then conveyed around the sprocket wheels 98 and 97 back to the front end of the distributing mechanism where it picks up another blank, and the operation is repeated.

In the embodiment shown in Figs. 10 to 12, the mode of operation is substantially the same as in the embodiment above described, and the same or corresponding reference numerals have been applied to like parts. In this embodiment a spring pressed slide bar 132ᵃ is slidably mounted in a sleeve 131ᵃ carried by the crossbar 125 of the carrier 96ᵃ, the slidebar and sleeve being disposed at a level below that of the lower run of chain 94. The latch 135ᵃ is located above the sleeve 131ᵃ so as to engage the teeth 134ᵃ which are formed on the top of the slidebar. The latch is provided with an integral extension or arm 155 arranged to engage a cam 116ᵃ as the carrier moves across the platform 71, thereby to effect the release of the latch and permit the slidebar to be moved outwardly so that the trip 140 engages the stop 34. In this embodiment the trip 140, when in retracted position, is disposed between the chain 94 and the inner face of the stanchions 99 and 101, so that it will clear the latter members during its travel about the sprocket wheels. As there is no necessity for elevating the trip in order to position the slidebar against the stop 34, the cam 110 and associated parts are dispensed with and for the same reason the cam 120 is likewise dispensed with and the inner end of the cam 121 terminates at a point between the vertical plane of the inner faces of the stanchions 99 and 101 and the chain 94, as shown in Fig. 12.

In this embodiment I have also shown a modified form of guiding means for the carrier as it approaches the platform, such guiding means comprising a laterally projecting boss 160 (Figs. 10 and 11) formed on the link connecting the end of the crossbar 125 with the chain 95. The boss 160 has a snug sliding fit in a channel 162 which constitutes a guide which is rigidly secured to the inner side of an angle iron forming part of the frame of the machine, the outer end of the guide channel being located adjacent to the sprocket wheel 97, as shown in Fig. 11.

While I have shown and described different desirable embodiments of the invention it is to be understood that this disclosure is for the purpose of illustration and that various changes in shape, proportion and arrangement of parts, as well as the substitution of equivalent elements for those herein shown and described, may be made without departing from the spirit and scope of the invention as set forth in the appended claims.

I claim:

1. A machine of the class described comprising a conveyor having a carrier moving in a fixed path of travel, a plurality of unloading stations disposed in a series along said path of travel, means for measuring the thicknesses of successive blanks and for discharging the measured blanks on a supporting member disposed in said path of travel so that said carrier moves the blanks along said path, and means for causing the blanks to be discharged at different stations according to their measured thicknesses, said means comprising a movable controller member associated with said measuring means and whose position relative to the path of travel of said carrier varies in accordance with the measured thickness of a blank discharged on said supporting member, a plurality of graduated abutments disposed along said path of travel one adjacent to each of said stations, an adjustable trip member mounted on said carriage and engageable with said abutments to effect the discharge of a blank being moved by said carrier at a predetermined one of said stations, means for moving said trip member against said controller member as said trip member is passing by said control member, thereby to position it in accordance with the measured thickness of a blank being moved, and means for repositioning said trip member after it has passed the final unloading station.

2. A machine of the class described comprising a conveyor having a carrier moving in a fixed path of travel, a plurality of unloading stations disposed in a series along said path of travel, means for measuring the thicknesses of successive blanks and for discharging the measured blank on a supporting member disposed in said path of travel so that said carrier moves the blanks along said path, and means for causing the blanks to be discharged at different stations according to their measured thicknesses, said means comprising a movable controller member associated with said measuring means and whose position relative to the path of travel of said carrier varies in accordance with the measured thickness of a blank discharged on said supporting member, a plurality of graduated abutments disposed along said path of travel one adjacent to each of said stations, an adjustable trip member mounted on said carriage and engageable with said abutments to effect the discharge of a blank being moved by said carrier at a predetermined one of said stations, means operative as said carrier moves across said supporting member to move said trip member against said controller member, thereby to position it in accordance with the measured thickness of a blank being moved, and means for repositioning said trip member after it has passed the final station.

3. A machine of the class described comprising a conveyor having a carrier moving in a fixed path of travel, a plurality of unloading stations disposed along said path of travel, means for measuring the thicknesses of successive blanks and for discharging the measured blank on a supporting member disposed in said path of travel so that said carrier moves the blanks along said path, and means for causing the blanks to be discharged at different stations according to their measured thicknesses, said means comprising a movable controller member associated with said measuring means and whose position relative to the path of travel of said carrier varies in accordance with the measured thickness of a blank discharged on said supporting member, a plurality of graduated abutments disposed along said path of travel, a spring-pressed trip member mounted on said carriage, a latch for holding said trip member in retracted position, said trip member upon the release of said latch being engageable first with said controller member and subsequently with said abutments to effect the discharge of a blank being moved by said carrier, means operative as said carrier moves across said supporting member to release said latch thereby to position said trip member against said controller member, and means for retracting said trip member after said carrier has passed the last station.

4. A machine of the class described comprising a plurality of receptacles arranged side by side, each receptacle having a trapdoor at its top that is part of a slideway and a releasable latch normally holding the door in closed position, a plurality of relatively offset abutments each associated with one of the latches, means for measuring blanks and discharging them onto said slideway, a conveyor including a carrier traveling along a fixed path which includes said slideway, the carrier being constructed and arranged to engage and move said blanks along said slideway, and means for causing the blanks to be discharged into different receptacles according to their measurements, said means comprising a movable controller member disposed adjacent to the path of said carrier, means associated with said measuring means for varying the position of said controller member relative to the path of travel of said carrier in accordance with the measurement of a blank discharged onto said slideway, an adjustable trip member mounted on said carrier and movable thereon toward and away from said controller member, means for moving said trip member transversely on said carrier into engagement with said controller member as it travels past the latter so that it will selectively engage one of said abutments, and means for repositioning said trip member after it has passed the final receptacle.

5. A machine of the class described comprising a plurality of receptacles arranged side by side, each receptacle having a trapdoor at its top and a releasable latch normally holding the door in closed position, the trapdoors collectively defining a slideway which includes a blank receiving platform, a plurality of relatively offset abutments each associated with one of the latches, means for measuring blanks and discharging them onto said platform, a conveyor including a carrier traveling along a fixed path which includes said platform and slideway, the carrier being constructed and arranged to engage and move a blank discharged onto the platform along said slideway, and means for causing the blanks to be discharged into different receptacles according to their measurements, said means comprising a controller member movable toward and away from the path of travel of said carrier, means associated with said measuring means for positioning said controller member, relative to said path of travel in accordance with the measurement of each blank discharged onto said platform, and an adjustable trip member mounted on said carrier so as to be positioned by said controller member so as selectively to engage one of said abutments and thereby effect the discharge of a blank carried thereby.

6. A machine of the class described comprising a plurality of receptacles arranged side by side, each receptacle having a trapdoor at its top and a releasable latch normally holding the door in closed position, the trapdoors collectively defining a slideway, a plurality of relatively offset abutments each associated with one of the latches, means providing a blank receiving platform at one end of said slideway, means for measuring blanks and discharging them onto said platform, a conveyor including a carrier traveling along a fixed path which includes said platform and slideway, the carrier being constructed and arranged to engage and move a blank discharged onto the platform along said slideway, and means for causing the blanks to be discharged into different receptacles according to their measurements, said means comprising a movable controller member disposed adjacent to said slideway, means associated with said measuring means for moving said controller member toward and away from the path of travel of said carrier in accordance with the measurement of a blank discharged onto said platform, an adjustable trip member mounted on said carrier and movable thereon toward and away from said controller member, means for moving said trip member transversely on said carrier into engagement with said controller member as it travels past the latter so that it will selectively engage one of said abutments and through the latter operate the latch of a predetermined one of said trapdoors thereby to effect delivery of said blank into the receptacle of said trapdoor, and means for repositioning said trip member after it has passed the final receptacle.

7. A machine of the class described comprising a plurality of receptacles arranged side by side, each receptacle having a gravity-opened door at its top and a releasable spring latch normally holding the door in closed position, the doors collectively defining a slideway, a plurality of relatively offset abutments each associated with one of the latches, a blank receiving platform at one end of said slideway, means for measuring blanks and discharging them onto said platform, a conveyor including a carrier traveling along a fixed path which includes said platform and slideway, the carrier being constructed and arranged to engage a blank discharged onto the platform and move it along said slideway, and means for causing the blanks to be discharged into different receptacles according to their measurements, said means comprising a movable controller member disposed adjacent to said platform, means associated with said measuring means for moving said controller member toward and away from the path of travel of said carrier in accordance with the measurement of a blank discharged onto said platform, an adjustable trip member mounted on said carrier and movable thereon toward and away from said controller member, means for moving said trip member transversely on said carrier into engagement with said controller member when it is opposite the latter so that it will selectively engage one of said abutments to release the door of a predetermined receptacle to effect delivery of said blank into the latter, and means on said conveyor for closing said door after such delivery, and means for repositioning said trip member after it has passed the final receptacle.

8. A machine of the class described comprising mechanism for measuring the thicknesses of blanks, a traveling conveyor constructed and arranged to move each measured blank positively throughout a fixed path extending from said measuring mechanism to a selected delivery station, means for causing the blanks to be delivered by said conveyor at different spaced apart delivery stations alongside of said path according to their measured thicknesses, said means comprising a movable controller member occupying a position adjacent to said path, mechanism controlled by the measuring mechanism for moving said controller member into an adjusted position relatively to said path which accords with the measured thickness of each blank, a plurality of graduated delivery-effecting abutments, one for each of said stations, an abutment-operating trip member movably mounted on said conveyor and normally occupying a retracted inoperative position, means operative to move said trip member on said conveyor into a projected operative position against said controller member as it passes the latter thereby to position the trip member to accord with the measured thickness of said blank so that as the movement of the conveyor continues said trip member selectively operates one of said abutment members to effect delivery of said blank at the station of said abutment member, and means for restoring said trip member to its normal retracted position after each blank delivery.

9. A machine of the class described comprising mechanism for measuring the thicknesses of blanks, a traveling conveyor constructed and arranged to move each measured blank positively throughout a fixed path extending from said measuring mechanism to a selected delivery station, means for causing the blank to be delivered by said conveyor at different spaced apart delivery stations alongside of said path according to their measured thicknesses, said means comprising a movable controller member occupying a position adjacent to said path, means through which said measuring mechanism acts to move said controller member into adjusted position relatively to said path according with the measured thickness of each blank, a plurality of graduated delivery-effecting abutments, one for each of said stations, an abutment-operating trip member movably mounted on said conveyor and normally occupying a retracted inoperative position, means operative to move said trip member on said conveyor into a projected operative position against said controller member as it passes the latter thereby to position the trip member to accord with the measured thickness of said blank so that as the movement of the conveyor continues said trip member selectively operates one of said abutment members to effect delivery of said blank at the station of said abutment member, and means for restoring said trip member to its normal retracted position after each blank delivery.

10. A machine of the class described comprising a conveyor having a carrier moving in a fixed path of travel, a plurality of unloading stations disposed in a series along said path of travel, means for measuring successive blanks and for discharging them in said path of travel so that said carrier moves them along said path of travel, and means for causing the measured blanks to be discharged at different stations according to their measurements, said means comprising a movable controller associated with said measuring means and whose position relative to said path of travel varies in accordance with the measurements of a blank discharged in said path of travel, a plurality of graduated abutments disposed along said path of travel, a trip member movably mounted on said carrier and normally disposed in an inoperative position, means operative to move said trip member into engagement with said controller thereby to position it so as to engage one of said abutments and effect the discharge of a blank being moved by said conveyor, and means for repositioning said trip member to inoperative position.

JAMES J. DONOVAN.